United States Patent

Shirk et al.

[11] Patent Number: 6,161,481
[45] Date of Patent: Dec. 19, 2000

[54] AIR BAG INFLATOR

[75] Inventors: Bryan W. Shirk, Mesa; Jess A. Cuevas, Scottsdale; Ahmad K. Al-Amin, Highley; Timothy A. Swann; Roy D. Van Wynsberghe, both of Mesa, all of Ariz.

[73] Assignee: TRW Inc., Lyndhurst, Ohio

[21] Appl. No.: 09/031,412

[22] Filed: Feb. 26, 1998

[51] Int. Cl.[7] .............................. B60R 21/26; F42C 19/00
[52] U.S. Cl. ...................... 102/530; 102/201; 137/68.19; 222/5; 280/737; 280/741
[58] Field of Search ................................. 102/201, 530, 102/531; 222/3, 5; 280/737, 741; 137/68.19, 68.29

[56] References Cited

U.S. PATENT DOCUMENTS

| | | | |
|---|---|---|---|
| 3,670,925 | 6/1972 | Moyant | 223/3 |
| 3,777,772 | 12/1973 | Arnold et al. | 222/3 |
| 5,263,740 | 11/1993 | Frey et al. | 280/737 |
| 5,351,989 | 10/1994 | Popek et al. | 280/737 |
| 5,406,889 | 4/1995 | Letendre et al. . | |
| 5,460,407 | 10/1995 | Stuckle . | |
| 5,660,413 | 8/1997 | Bergerson et al. . | |
| 5,673,934 | 10/1997 | Saccone et al. | 222/3 |
| 5,720,495 | 2/1998 | Faigle et al. | 280/737 |
| 5,762,369 | 6/1998 | Mooney et al. | 280/741 |
| 5,906,394 | 5/1999 | Van Wynsberghe et al. | 280/737 |

OTHER PUBLICATIONS

"Fluid Pressure Indicator for Vehicle Occupant Restraint Systems" #37432, Research Disclosure, Jun. 1995, pp. 416 & 417.

"Laser", Microsoft Encarta 98 Encyclopedia, copyright 1993–1997, Microsoft Corporation.

*Primary Examiner*—Harold J. Tudor
*Attorney, Agent, or Firm*—Tarolli, Sundheim, Covell, Tummino & Szabo L.L.P.

[57] ABSTRACT

An apparatus (10) for helping to protect a vehicle occupant in the event of a collision comprises an inflatable vehicle occupant protection device (12) and an inflator (14, 114). The inflator (14, 114) has a source of inflation fluid (48, 148) in a chamber (46) of the inflator (14, 114) for inflating the protection device (12). The inflator (14, 114) includes a passage (68) through which inflation fluid flows from the chamber (46) into the protection device (12). The inflator (14, 114) also has a burst disk (44) which blocks the passage (68). An actuatable source (90) of laser light, when actuated, emits laser light which impinges on the burst disk (44) to cause the burst disk to rupture and release the inflation fluid from the chamber (46).

9 Claims, 1 Drawing Sheet

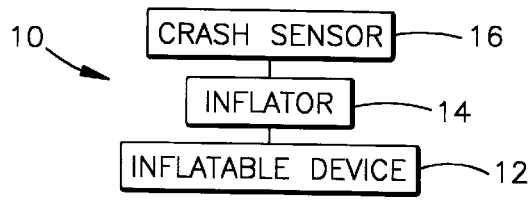
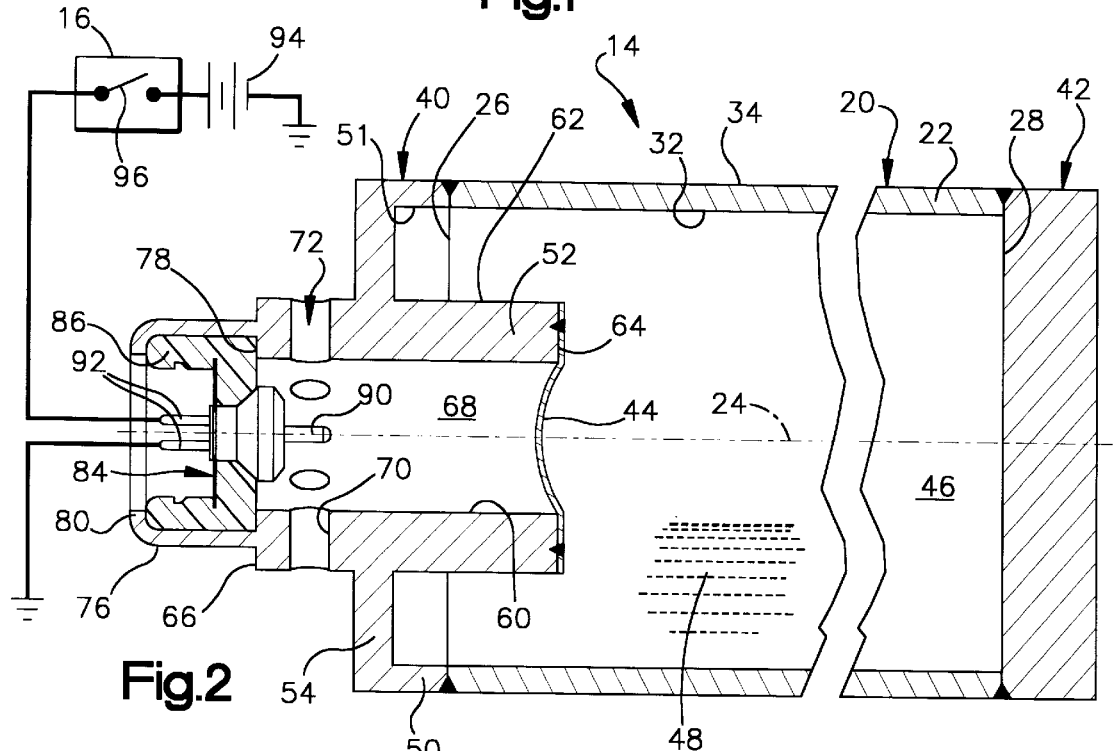
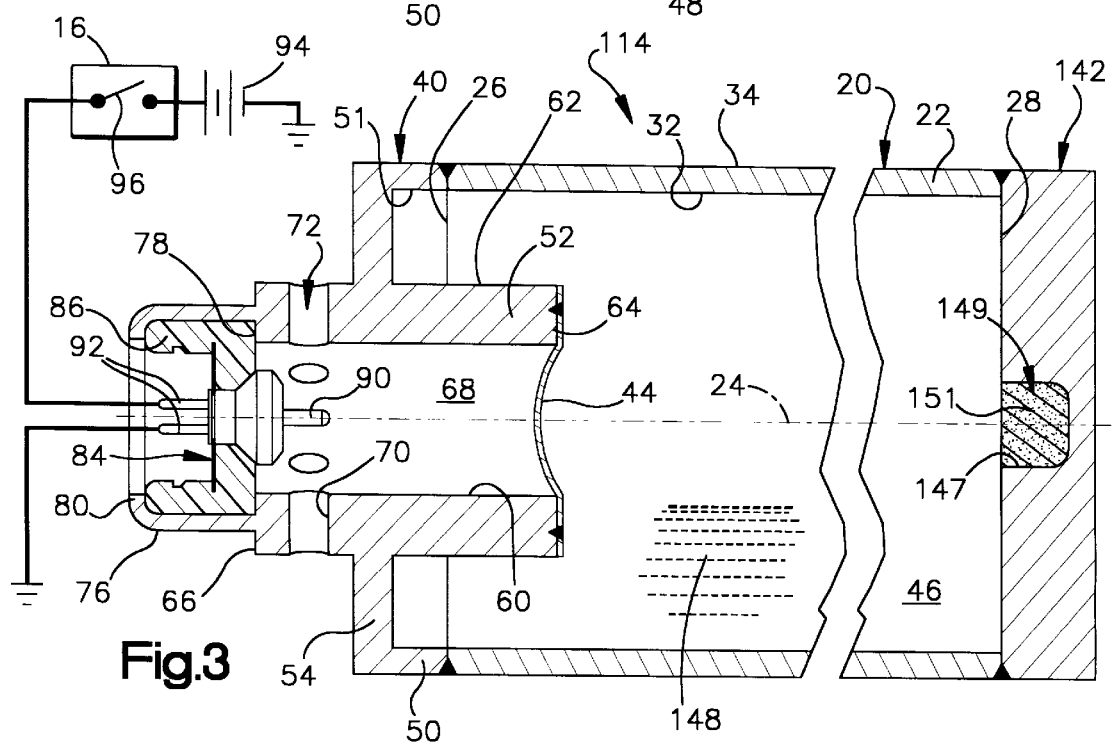

AIR BAG INFLATOR

TECHNICAL FIELD

The present invention relates to an apparatus for helping to protect a vehicle occupant in the event of a collision and particularly relates to an inflator for an inflatable vehicle occupant protection device, such as an air bag.

BACKGROUND OF THE INVENTION

A known inflator for inflating a vehicle occupant protection device, such as an air bag, includes a rupturable burst disk for blocking flow of stored gas out of a chamber of a container. A pyrotechnic charge is typically required to rupture the burst disk to release the stored gas to inflate the air bag. It is desirable to be able to rupture the burst disk without the use of a pyrotechnic charge.

SUMMARY OF THE INVENTION

The present invention relates to an apparatus for helping to protect a vehicle occupant in the event of a collision. The apparatus comprises an inflatable vehicle occupant protection device and an inflator having a source of inflation fluid in a chamber of the inflator for inflating the protection device. The inflator includes a passage through which inflation fluid flows from the chamber into the protection device. The inflator has a burst disk which blocks the passage. The apparatus also includes an actuatable source of laser light for, when actuated, emitting laser light which impinges on the burst disk to cause the burst disk to rupture and release the inflation fluid from the chamber.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection system embodying the present invention;

FIG. 2 is a schematic sectional view of parts of the vehicle occupant protection system of FIG. 1; and FIG. 3 is a view similar to FIG. 2 illustrating a second embodiment of the present invention.

DESCRIPTION OF PREFERRED EMBODIMENTS

Referring to FIG. 1, a vehicle occupant protection system 10 includes an inflatable vehicle occupant protection device 12. In the preferred embodiment of the present invention, the inflatable vehicle occupant protection device 12 is an air bag. The inflatable vehicle occupant protection device could be, for example, an inflatable seat belt, an inflatable knee bolster, an inflatable head liner or side curtain, or a knee bolster operated by an inflatable air bag.

An inflator 14 is associated with the inflatable air bag 12. The inflator 14 is actuatable to direct inflation fluid to the air bag 12 to inflate the air bag.

The system 10 also includes a crash sensor 16. The crash sensor 16 is a known device that senses a vehicle condition, such as vehicle deceleration, indicative of a collision. The crash sensor 16 measures the magnitude and duration of the deceleration. If the magnitude and duration of the deceleration meet or exceed predetermined threshold levels, a deployment signal is then transmitted to the inflator 14 to actuate the inflator.

When the inflator 14 is actuated, it directs inflation fluid into the air bag 12 to inflate the air bag. When the air bag 12 is inflated, it extends into the occupant compartment of the vehicle to help protect a vehicle occupant from a forceful impact with parts of the vehicle due to a vehicle collision.

In a first embodiment, the inflator 14 includes a container 20 made of a suitable material, such as steel or aluminum. The container 20 includes a generally cylindrical side wall 22 defining a tubular container portion extending along a longitudinal central axis 24 between a first open end 26 and a second open end 28 of the tubular container portion. The side wall 22 includes a generally cylindrical inner surface 32 and a generally cylindrical outer surface 34.

The container 20 further includes an end cap 40 secured to the first open end 26 by any suitable means, such as a weld. The container 20 also includes an end plug 42 secured to the second open end 28 by any suitable means, such as a weld. The end cap 40 includes a burst disk 44. The burst disk 44 is made of a suitable metal and has a first mechanical strength. The side wall 22, the end cap 40, the burst disk 44 and the end plug 42 cooperate to define a closed chamber 46 in the container 20.

A supply of gas 48 for inflating the air bag 12 is stored in the chamber 46. The stored gas 48 in the preferred embodiment of the invention comprises a non-combustible inert gas such as air, nitrogen, helium, argon, or a mixture of these gases. Preferably, the stored gas 48 includes at least a small amount of a tracer gas, such as helium, for helping to detect gas leaks.

The stored gas 48 within the container 20 is under pressure. The pressure depends upon such factors as the volume of the air bag 12 to be inflated, the time available for inflation, the inflation pressure desired and the volume of the chamber 46 storing the gas 48. The stored gas 48 in the chamber 46 is typically at a pressure of about 2,000 to about 8,000 pounds per square inch (psi). Preferably, the stored gas 48 in the chamber 46 is at a pressure of about 3,500 to about 6,500 psi.

In accordance with the present invention, the end cap 40 includes a first cylindrical wall 50 having a first diameter and a second cylindrical wall 52 having a second, smaller diameter. The cylindrical walls 50 and 52 are coaxial with the side wall 22. The first cylindrical wall has an inner surface 51 with the same diameter as the inner surface 32 of the side wall 22. An annular end wall 54 extends perpendicular to axis 24 between and connecting the first and second cylindrical walls 50 and 52.

The second cylindrical wall 52 has a cylindrical inner surface 60 and a cylindrical outer surface 62 parallel to the inner surface. The inner surface 60 of the second cylindrical wall 52 has a second diameter which is smaller than the first diameter. The inner surface 60 extends between a first annular surface 64 and a second annular surface 66 of the second cylindrical wall 52 to define a central passage 68 in the end cap 40 of the container 20. The burst disk 44 is secured to the first annular surface 64 by any suitable means, such as a weld, to block the central passage 68.

A plurality of cylindrical surfaces 70 extend radially between the inner surface 60 and the outer surface 62 of the second cylindrical wall 52 of the end cap 40 to define a plurality of diffuser passages 72. The diffuser passages 72 provide fluid communication between the central passage 68 and the air bag 12. The central passage 68, when not blocked by the burst disk 44, provides fluid communication between the diffuser passages 72 and the chamber 46.

A cylindrical mounting wall 76 extends axially away from the second annular surface 66. The mounting wall 76 is spaced radially outward of the inner surface 60 of the second cylindrical wall 52 to define a mounting surface portion 78 on the second annular surface 66. The mounting wall 76 includes a crimped flange portion 80, which extends axially when it is in its uncrimped position (not shown) and which extends radially inward when it is in its crimped position, as shown in FIG. 2.

A laser diode assembly 84 is disposed radially inward of the mounting wall 76 of the end cap 40. The laser diode assembly 84 includes a housing 86 disposed axially between the mounting surface portion 78 of the second annular surface 66 and the crimped flange portion 80 of the mounting wall 76.

A laser diode 90 (shown schematically) is disposed in the housing 86, centered on the axis 24 and facing the burst disk 44. A pair of electrodes 92 extend from the laser diode 90 and connect the laser diode in an electrical circuit (schematically shown) with a power source 94 and a normally open switch 96. The power source 94 is preferably the vehicle battery or a capacitor. The laser diode 90 and the power source 94 are both connected to the vehicle's electrical ground, as shown schematically in FIG. 2. The switch 96 is part of the crash sensor 16.

Upon the occurrence of sudden vehicle deceleration indicative of a collision for which inflation of the air bag 12 is desired, the sensor 16 closes the switch 96 to transmit electric current from the power source 94 to the laser diode 90. The electric current actuates the laser diode 90, causing the laser diode to emit laser light which is projected axially through the central passage 68 of the end cap 40 to the burst disk 44. The laser light impinges on the burst disk 44 and heats the burst disk 44 to weaken the burst disk so that the burst disk opens.

Weakening of the burst disk 44 can take the form of melting a hole in the burst disk. Weakening the burst disk 44 could also take the form of heating the burst disk to reduce the mechanical strength of the burst disk from the first mechanical strength to a second mechanical strength.

When the burst disk 44 is at the second mechanical strength, the burst disk ruptures under the pressure of the stored gas 48. Opening of the burst disk 44 enables the stored gas 48 to flow out of the chamber 46 through the central passage 68 and the diffuser passages 72 into the air bag 12. This inflates the air bag 12 into a predetermined position to help protect a vehicle occupant from forcibly striking parts of the vehicle.

FIG. 3 illustrates an inflator 114 constructed in accordance with a second embodiment of the present invention. Many of the parts of the inflator 114 are the same as parts of the inflator 14 of the first embodiment and are identified in FIG. 3 using the same reference numerals as in FIG. 2. Parts of the inflator 114 that differ from the parts of the inflator 14 of FIG. 2 are given different reference numerals.

The inflator 114 can be used with the vehicle occupant protection system 10 of the first embodiment. The inflator 114 has an end plug 142 which differs from the end plug 42. The end plug 142 includes an axially extending cylindrical surface 147 which defines a cylindrical cavity 149. A body 151 of pyrotechnic material is disposed within the cylindrical cavity 149. The body 151 of pyrotechnic material is preferably zirconium potassium perchlorate ($ZrKNO_3$) but could be any suitable pyrotechnic material, such as $BKNO_3$.

A supply of gas 148 for inflating the air bag 12 is stored within the chamber 46. The stored gas 148 in the second embodiment of the invention comprises a combustible mixture of gases including an inert gas, a combustible fuel gas and an oxidizer gas. The inert gas is preferably nitrogen, argon or a mixture of nitrogen and argon. The fuel gas is preferably hydrogen or a mixture of hydrogen and a hydrocarbon, such as methane. The oxidizer gas is preferably oxygen. The stored gas 148 could also comprise air and hydrogen.

The stored gas 148 within the container 20 is normally under pressure. The pressure, as in the first embodiment, depends upon such factors as the volume of the air bag 12 to be inflated, the time available for inflation, the inflation pressure desired, the volume of the chamber 46 storing the gas 148, and the molar percentage of each of the gases in the air bag inflation gas. The stored gas 148 in the chamber 46 is typically at a pressure of about 500 to about 5,000 pounds per square inch (psi). Preferably, the stored gas 148 in the chamber 46 is at a pressure of about 2,000 to about 4,000 psi.

Upon the occurrence of sudden vehicle deceleration indicative of a collision for which inflation of the air bag 12 is desired, the sensor 16 closes the switch 96 to transmit electric current from the power source 94 to the laser diode 90. The electric current actuates the laser diode 90, causing the laser diode to emit laser light which is projected axially through the central passage 68 of the end cap 40 to the burst disk 44. The laser light impinges on the burst disk 44 and heats the burst disk to weaken the burst disk so that the burst disk opens in the same manner as described above in the first embodiment. Opening of the burst disk 44 enables the stored gas 148 to flow out of the chamber 46 through the central passage 68 and the diffuser passages 72 into the air bag 12 to inflate the air bag 12 into a predetermined position to help protect a vehicle occupant from forcibly striking parts of the vehicle.

Moreover, with the burst disk opened, the laser light from the laser diode 90 travels axially through the chamber 46 and impinges on the body 151 of pyrotechnic material. The body 151 of pyrotechnic material is ignited by the laser light. Ignition of the body 151 of pyrotechnic material ignites the fuel gas in the stored gas 148.

Burning of the fuel gas results in combustion products, which include heat and any other gases or vapors which may result from the combustion of the fuel gas. The combustion products mix with the unburned portion of the stored gas 148 to increase the pressure of the stored gas to augment inflation of the air bag 12.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant in the event of a collision, the apparatus comprising:

an inflatable vehicle occupant protection device;

an inflator having a chamber containing a source of inflation fluid for inflating the protection device, the source of inflation fluid being a combustible mixture of gases;

the inflator including a passage through which inflation fluid flows from the chamber into the protection device, the inflator further including an end cap and an end plug located on opposite ends of the chamber, the end cap supporting a burst disk which blocks the passage, the end plug containing a body of pyrotechnic material; and an actuatable source of laser light disposed within the inflator, the source of laser light including a laser diode which is supported by the end cap and faces the burst disk, when actuated the laser diode emitting laser light which impinges on the burst disk causing the burst disk to rupture and to release the inflation fluid from the chamber.

2. An apparatus as defined in claim 1 wherein said burst disk has a first mechanical strength when blocking said passage, said burst disk rupturing due to the pressure of said inflation fluid in response to said burst disk acquiring a second mechanical strength when said laser light impinges said burst disk.

3. An apparatus as defined in claim 2 wherein said burst disk acquires said second mechanical strength due to said laser light heating said burst disk when said laser light impinges said burst disk.

4. An apparatus as defined in claim 1 wherein said laser light burns a hole in said burst disk to rupture said burst disk when said laser light impinges said burst disk.

5. An apparatus as defined in claim 1 wherein said body of pyrotechnic material is ignitable by said laser light after said burst disk ruptures.

6. An apparatus for helping to protect a vehicle occupant in the event of a collision, the apparatus comprising:

an inflatable vehicle occupant protection device;

an inflator having a chamber containing a source of inflation fluid for inflating the protection device, the source of inflation fluid being a stored gas under pressure;

the inflator including a passage through which inflation fluid flows from the chamber into the protection device, the inflator further including a body of pyrotechnic material located within the chamber and a burst disk which blocks the passage from the chamber to the protective device; and an actuatable source of laser light located outside the chamber, when actuated the source of laser light emitting a laser light which is directed at and impinges upon the burst disk causing the burst disk to rupture and to release the inflation fluid from the chamber, after the burst disk ruptures the laser light being directed at and igniting the body of pyrotechnic material to increase the pressure of the inflation fluid in the chamber.

7. An apparatus as defined in claim 6 wherein the burst disk has a first mechanical strength when blocking the passage, the burst disk rupturing due to the pressure of the inflation fluid in response to the burst disk acquiring a second mechanical strength when the laser light impinges the burst disk.

8. An apparatus as defined in claim 7 wherein the burst disk acquires the second mechanical strength due to the laser light heating the burst disk when the laser light impinges the burst disk.

9. An apparatus as defined in claim 6 wherein the laser light burns a hole in the burst disk to rupture the burst disk when the laser light impinges the burst disk.

\* \* \* \* \*